No. 864,023. PATENTED AUG. 20, 1907.
R. H. McCAUGHEY.
BOTTLE.
APPLICATION FILED MAY 18, 1907.
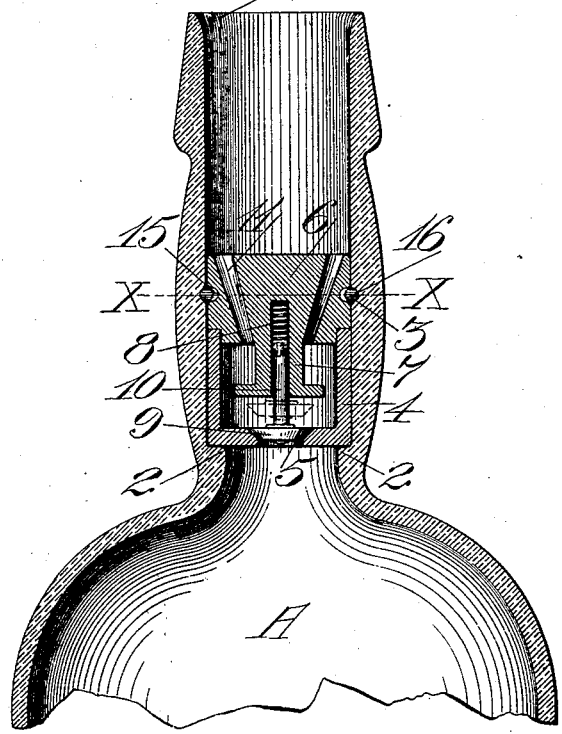
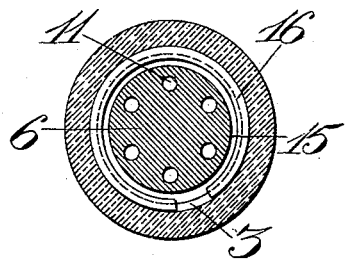
WITNESSES:
INVENTOR
Ralph H. McCaughey
BY
Geo. H. Strong
ATTORNEY

UNITED STATES PATENT OFFICE.

RALPH H. McCAUGHEY, OF CAMPBELL, CALIFORNIA.

BOTTLE.

No. 864,023.   Specification of Letters Patent.   Patented Aug. 20, 1907.

Application filed May 18, 1907. Serial No. 374,412.

*To all whom it may concern:*

Be it known that I, RALPH H. McCAUGHEY, a citizen of the United States, residing at Campbell, in the county of Santa Clara and State of California, have invented new and useful Improvements in Bottles, of which the following is a specification.

My invention relates to improvements in bottles, and is designed to provide a means whereby the bottle will discharge its contents, but cannot be again refilled.

It consists in the combination of parts, and in details of construction which will be more fully explained by reference to the accompanying drawings, in which—

Figure 1 is a vertical sectional view of the upper portion of the bottle embodying my invention. Fig. 2 is a cross-sectional view on the line X—X of Fig. 1.

A is a bottle, the neck of which is formed with an interior shoulder 2, near the lower end, and an interior circumferential groove or channel 3, at a point higher up, and between which points my device is located.

The device consists of a cylindrical casing 4 open at the top having a substantially flat lower end, with a valve seat 5 formed within it. The periphery of the bottom around the valve seat rests upon the shoulder 2.

6 is a cylindrical plug having the lower end reduced so that it fits into the top of the cylinder 4, and it may be secured either by being a sufficiently tight fit, or by some direct securing device. This plug 6 has a stem 7 extending centrally downward into the cylinder 4, and this stem has a vertical central hole made in it to contain a light spiral spring 8.

9 is a valve having a stem 10 which extends up into the central opening within which the stem is guided, and the upper end of the stem contacts with the spring 8 so that when the parts are in position, the valve is normally forced down upon the seat 5.

The plug 6 has holes, or perforations extending through it, as shown at 11. These holes are made convergent from the upper ends which are near the periphery of the plug at the top, to a point close to the central stem 7 at the bottom, where they open into the chamber below. Around this stem, at a point sufficiently near the lower ends of the openings, and between the bottom of the plug 6 and the valve 9, is fixed a disk of preferably greater diameter than that of the valve. This disk has sufficient space around its periphery to allow liquid to flow freely from the bottle, when the valve is lifted, and around the edge of the disk, thence escaping through the holes in the plug. The convergence of these holes prevents the effective use of a wire or other device introduced through the holes for the purpose of attempting to hold the valve open so that the bottle could be refilled, since such a wire would be brought substantially into contact with the small stem 7, and in addition it would have to be bent outwardly around the periphery of the disk, and then inwardly again to engage the valve, which would be an impossibility.

The spring against which the valve stem contacts is sufficiently strong to maintain the valve in a closed position when there is nothing in the bottle; but when the bottle is inverted the weight of its contents will be sufficient to force the valve open and allow the contents to escape, passing through the opening which is normally closed by the valve seat, thence inwardy around the periphery of the disk thence inwardly to the inner ends of the discharge openings through the plug, and thence flowing out through the outer ends and out of the bottle neck. When the bottle is tilted, and not absolutely vertical the lowermost of the openings will discharge the liquid, while air to take its place will enter through the uppermost openings. As soon as the contents of the bottle are exhausted, the spring will act to close the valve, and whatever position the bottle will then be placed in, will not serve to again open it.

The bottle may be made of glass, or any suitable or desired material, and constructed with the seat or shoulder 2 and the groove 3 as previously described.

The upper end of the bottle neck may be slightly flaring, as shown at 14, for a purpose to be hereafter described. Around the plug 6 is a groove or channel 15, which when the device is seated upon the shoulder 2, will register with the groove or channel 3 in the bottle neck.

16 is an elastic wire or equivalent spring normally fitting the groove or channel 15, and having such diameter that it will project outside of this groove or channel. When the device is to be introduced into the bottle, this spring will contact with the divergent or flaring mouth 14 of the bottle, and will thus be compressed into the groove 15 so that the device can be easily introduced into the bottle and pushed down until the lower end rests upon the seat 2. At that instant, the groove or channel 15 will have reached a position where it registers with the groove or channel 3 of the bottle-neck, and the spring ring by its elasticity will expand sufficiently to extend into the groove 3; a portion of the spring remaining in the groove 15 permanently locks the device in the bottle neck.

Having thus described my invention, what I claim and desire to secure by Letters Patent is—

1. A bottle having a seat within the neck and an annular interior groove above the seat, a valve chamber adapted to rest upon the seat, and having an opening through its bottom, a plug fitting the upper end of the valve chamber having channels diverging upwardly and outwardly from the lower part, a central hollow guide sleeve and a valve closable upon the opening in the bottom of the chamber, a stem fitting the sleeve and a spring contained in the sleeve and acting against the valve stem.

2. A bottle having an automatic closure and means to secure it within the neck, said closure including a chamber with a spring-closed outwardly opening valve, a superposed plug with a downwardly extending guide sleeve, passages converging from near the periphery of the outer end of the plug to a close proximity with the sleeve at the inner end, and a disk inclosing the sleeve between the plug and the valve.

3. In a bottle closing device, a cylindrical chamber, and a superposed plug having a central guide sleeve extending into the chamber, a valve closable against the bottom of the chamber and having a stem slidable within the sleeve, a spring within the sleeve to hold the valve normally closed, a disk inclosing the sleeve between the valve and the plug, said plug having passages diverging outwardly from near the sleeve, to points near the periphery of its outer end.

In testimony whereof I have hereunto set my hand in presence of two subscribing witnesses.

RALPH H. McCAUGHEY.

Witnesses:
F. B. BILLINGS,
C. H. WHITMAN.